Figure 1:
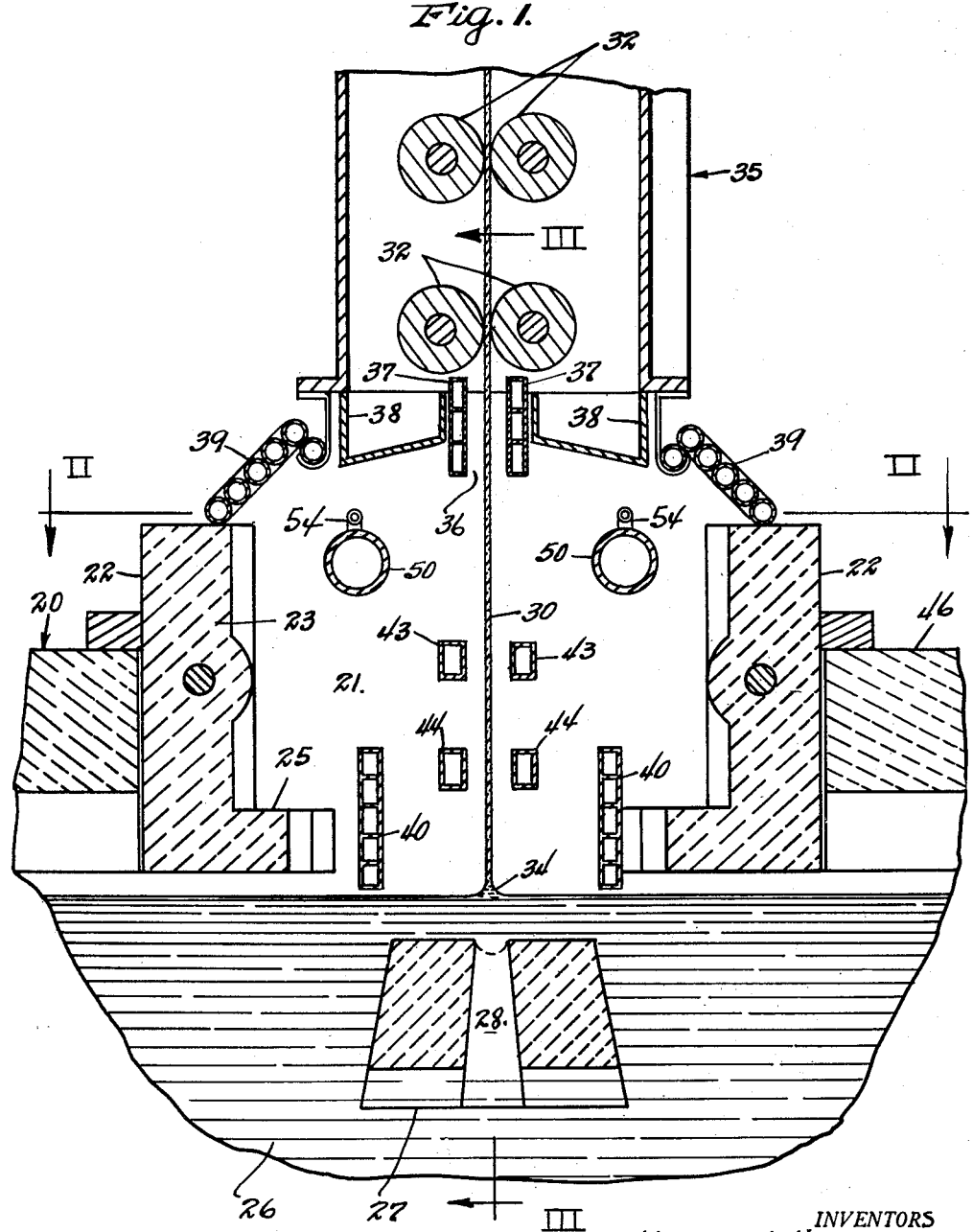

INVENTORS
HOWARD L. HALBACH
GEORGE D. CAMPBELL
WALTER G. KOUPAL
BY Drew E. Bee
ATTORNEY.

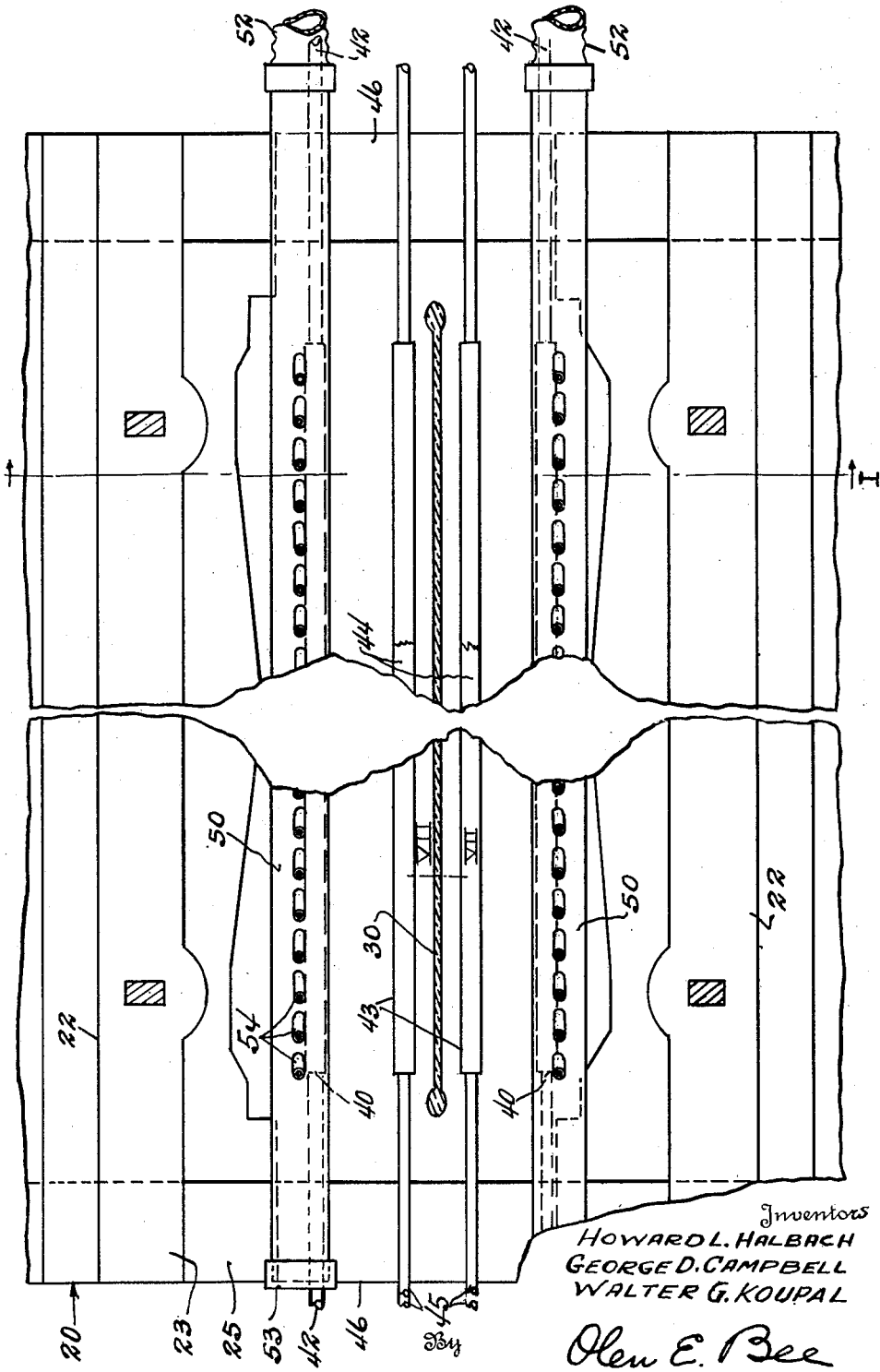

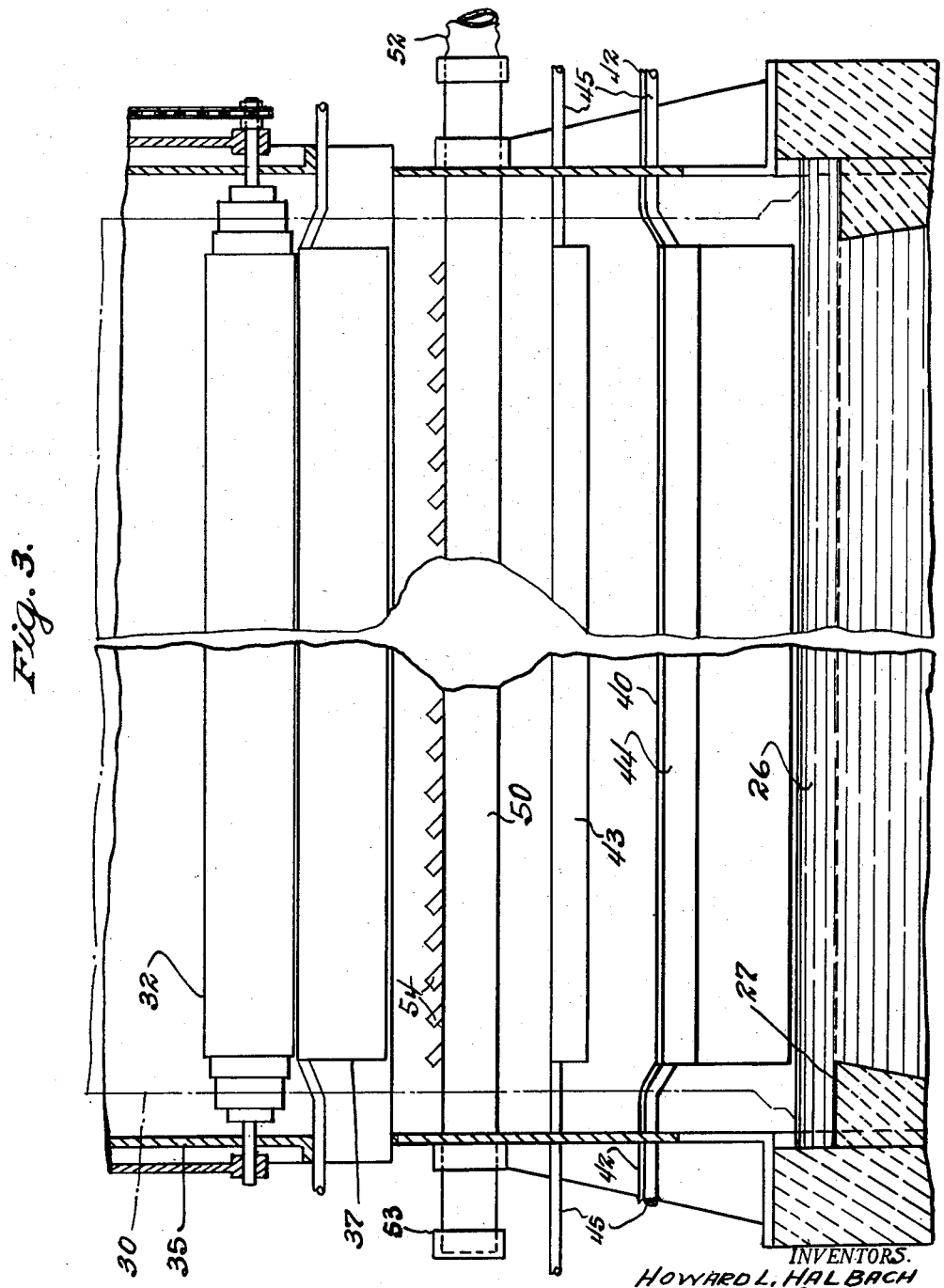

Aug. 22, 1950   H. L. HALBACH ET AL   2,519,457
METHOD OF AND APPARATUS FOR DRAWING SHEET GLASS
Filed June 24, 1944   4 Sheets-Sheet 4
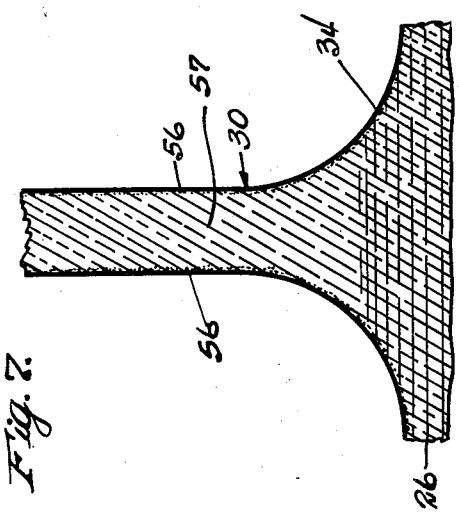
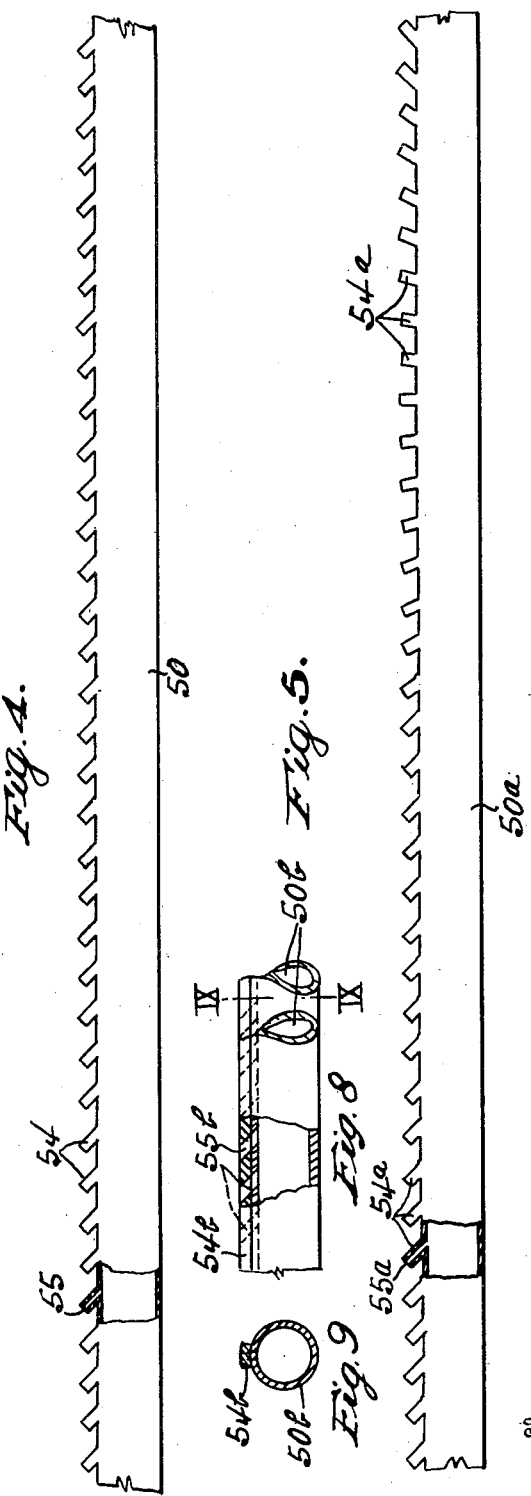
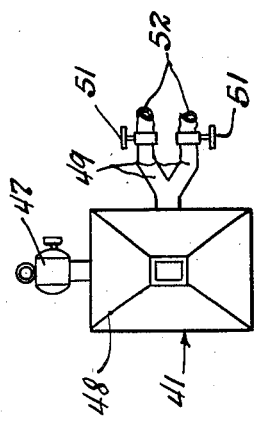
Inventors
HOWARD L. HALBACH
GEORGE D. CAMPBELL
WALTER G. KOUPAL
By Olen E. Bee
Attorney Patented Aug. 22, 1950

2,519,457

UNITED STATES PATENT OFFICE 2,519,457

METHOD OF AND APPARATUS FOR DRAWING SHEET GLASS

Howard L. Halbach, Pittsburgh, Pa., and George D. Campbell and Walter G. Koupal, Clarksburg, W. Va., assignors to Pittsburgh Plate Glass Company, a corporation of Pennsylvania Application June 24, 1944, Serial No. 541,958

7 Claims. (Cl. 49—17)

This invention relates to the manufacture of sheet glass and it has particular relation to apparatus for drawing sheet glass or window glass from a molten glass batch.

The substance of the invention disclosed and claimed herein constitutes a continuation-in-part of our copending application Serial No. 307,086, filed December 1, 1939 for Method of and Apparatus for Drawing Sheet Glass and issued as Patent No. 2,352,539 on June 27, 1944.

One object of the invention is to provide improved apparatus for and methods of drawing sheet glass which compares favorably in smoothness and uniformity of thickness to ground and polished plate glass.

Another object of the invention is to provide an improved arrangement for introducing gaseous fluid into a drawing chamber of a glass melting tank.

Another object of the invention is to improve methods of manufacture of glass in drawing apparatus in which gaseous fluid is so controlled as to insure the production of sheet glass substantially free from ribs, streaks, or other distortion.

Another object of the invention is to provide an improved manifold structure for introducing gaseous fluid into the drawing chamber of an apparatus for drawing sheet glass and for controlling the action of the gaseous fluid therein.

In the art of drawing sheet glass, or window glass, developments over a long period of years have been slowly progressing in the direction of the production of window glass which is free from ribs, wrinkles, streaks, uneven thickness, so-called "batter," the latter of which designates a surface condition resembling a hammered texture, etc. In fact, it has previously been the unattained goal in the art of drawing sheet glass to produce sheets simulating ground and polished plate glass in smoothness, degree and uniformity of thickness, etc.

Marginal portions of the drawn sheet glass are always more or less rough and ribbed and edge trimmers are employed to remove these rough marginal portions. The surface pattern of drawn sheet glass becomes progressively better or smoother from the glass edges toward the central portion thereof. The present invention is also designed to reduce this rough marginal portion of the sheet glass to a minimum.

According to the invention herein presented, an apparatus has been devised which produces drawn sheet glass or window glass of such refined quality as to be directly comparable to plate glass, and this new sheet glass has a uniformity of thickness and surface smoothness far in advance of any sheet glass heretofore produced by any known drawing process. In fact, there has been produced continuously by the improved drawing process sheet glass of various thicknesses, and the outstanding improvements were equally evident regardless of whether the glass sheets were drawn at minimum or maximum thickness.

One type of glass melting tank of practical design is provided with a drawing chamber through which the sheet glass is drawn by driven rolls from a molten bath upwardly through the roof of the drawing chamber into a vertical leer in which several pairs of drawing rolls are operated. This leer is partially enclosed and hot gases from the drawing chamber tend to rise and to be drawn upwardly by virtue of convection currents and draft action created in the leer and drawing chamber. The opening from the drawing chamber into the leer is in the form of a relatively narrow slot through which the sheet glass passes freely.

In the connection with the drawing of sheet glass a practical arrangement of leer, drawing rolls, and operating mechanism therefor, is shown in U. S. Patent No. 2,300,522, issued to J. H. Redshaw on November 3, 1942.

In one phase of operation of the improved apparatus, gaseous fluid is introduced into the drawing chamber to dampen or approximately dissipate or choke off draft action and convection currents along the surfaces of the sheet glass, which is drawn from a molten glass bath. Particularly, the lower portion of the drawing chamber adjacent the plane of drawing is thus provided with a quiescent zone which insures uniform cooling of the sheet glass from its base or meniscus upwardly along the setting zone thereof. One arrangement for so introducing gaseous fluid includes conduits which are disposed on opposite sides of the sheet glass and are provided with openings for expelling fluid upwardly into the upper zone of the drawing chamber, while creating a quiescent zone in the lower portion thereof along the sheet glass.

In operating glass drawing apparatus of this kind the atmosphere surrounding the drawing chamber is not always uniform in temperature. Various factors are responsible for this condition. For example, one side of the drawing chamber may be located adjacent a cooler open area in a factory building in which the apparatus is installed, or near an outside wall of the building, while the other side may be located adjacent another hot drawing chamber or furnace. Such factors may influence the drift of atmosphere in the drawing chamber and if the drifting atmosphere concentrates in any area of the chamber adjacent the sheet glass, it is likely to be a starting point for an upward current that will mar the surface pattern of the drawn glass. Other factors inside the chamber are also likely to cause differentials in temperature. In any event, a drift of atmosphere toward a particular area may define the location of the beginning of undesirable upward drafts. The drifting atmosphere itself does not mar the surface of the glass and is distinguished from drafts and currents.

An important phase of the present invention involves the control of the atmosphere in the drawing chamber regardless of where concentration of drifting atmosphere might tend to permit an upward current that would cause ribs or streaks on the glass. Conduits for introducing gaseous fluid into the chamber are so arranged and constructed as to discharge gaseous fluid in such relation as to prevent upward currents or other currents that otherwise would cause ribs and streaks to form at the marginal or other portions of the drawn glass.

In the drawing:

Fig. 1 is a fragmentary vertical section taken substantially along the line I—I of Fig. 2 of a sheet glass drawing apparatus including a drawing chamber and a vertical leer into which the glass is adapted to be drawn; Fig. 2 is a fragmentary horizontal section taken substantially along the line II—II of Fig 1; Fig. 3 is a fragmentary vertical section taken substantially along the line III—III of Fig. 1; Fig. 4 is a fragmentary side elevation of a fluid discharging conduit; Fig. 5 is a fragmentary side elevation similar to Fig. 4 to show another form of conduit; Fig. 6 is a diagrammatic plan, on a smaller scale, of a blower and heater for controlling pressure and temperature of air or other gaseous fluid; Fig. 7 is a fragmentary vertical section, on a larger scale, taken substantially along the line VII—VII of Fig. 2; Fig. 8 is a fragmentary view showing parts of another form of conduit in side elevation and parts in vertical section; and Fig. 9 is a cross-section taken substantially along the line IX—IX of Fig. 8.

In practicing the invention, a glass melting tank 20 is provided with the drawing chamber 21 partially defined by L-blocks 22 having vertical flange sections 23 and lower horizontal flange sections 25, the latter of which are arranged just above and substantially parallel to the surface of a molten glass bath 26 confined in the tank and flowing into the drawing chamber. The vertical plane of drawing in its beginning is determined by an oblong draw-bar 27 horizontally disposed and having formed longitudinally therein a slot 28 from which the glass is drawn upwardly into the form of sheet glass 30. Pairs of driven rolls 32 are mounted in a leer 35 constructed above the drawing chamber to receive the sheet 30 between rolls of each pair, and provide power to maintain uniform upward movement of the sheet glass. The rolls 32 and drawbar 27 define the plane of drawing of the sheet glass. The sheet glass from its base or meniscus 34 passes upwardly through a horizontal opening or slot 36 between cullet pan coolers 37, so called because they are located adjacent and between a pair of cullet pans 38 which form a portion of the roof of the drawing chamber and define the opening 36. The upper edge of each cullet pan cooler 37 is disposed closely adjacent the periphery of a lower driven roll 32 and this arrangement facilitates the control of air or gas as it moves upwardly from the upper opening in the drawing chamber.

Fluid-containing coolers 39 for circulating water, or the like, are mounted adjacent the outer sides of the cullet pans 38 between the latter and the upper portions of the vertical flange sections 23 of the L-blocks 22. These coolers 39 are conventional in construction and function, and constitute a portion of the enclosing wall structure of the drawing chamber.

So-called big coolers 40 are disposed transversely of the drawing chamber substantially parallel to the plane of drawing and are disposed in spaced relation to opposite sides thereof. Each big cooler 40 includes fluid supply conduits 42 for circulating therethrough water, or other fluid, and these big coolers, which are somewhat flat in contour, are arranged adjacent the inner extremities of the lower horizontal sections 25 of the L-blocks and extend upwardly in such position as to have their top edges disposed upwardly a considerable distance toward the central portion of the chamber 21. They present flat sides or walls in spaced relation on opposite sides of the lower portion of the sheet 30.

Other coolers designated as door coolers 43 and baby coolers 44 are arranged in spaced relation, one above the other, on each side of the sheet glass 30. These coolers are provided with fluid circulating conduits 45 and suitable fluid, such as water, is supplied thereto in a conventional manner for the purpose of insuring more favorable speed and cooling action in drawing the glass.

The structure just described, including the L-blocks 22, various coolers 37, 39, 40 and 44, cullet pans 38, leer 35, etc., are all supported in the walls 46 of the glass melting tank, or are carried upon suitable foundations (not shown) in connection with the conventional construction of the melting tank.

In connection with the glass drawing tank a suitable fluid control apparatus 41 (Fig. 6) is provided in which a blower 47 communicates with a heater 48 and cooperates therewith to supply heated air or other gaseous fluid through conduits 49 at desired relative temperatures and pressures.

In the upper portion of the drawing chamber 21, two substantially horizontal fluid discharging conduits 50 are carried in the tank walls 46 and are provided with flexible fluid conveying lines 52 secured thereto and to the outer ends of the supply conduits 49 of the heater 48. These conduits are substantially parallel and are disposed approximately at equal distances on opposite sides of the sheet glass 30. Each conduit 50, which is closed at one end, as indicated at 53, has a row of nipples 54 integral therewith. These nipples are disposed at an angle to the horizontal on the upper side of each conduit 50 and they have openings 55 therein communicating with the interior of the conduit. Although these nipples are sloping they face generally upwardly in planes adjacent opposite sides of the plane of drawing and communicate through the conduits 50, 52 and 49 with the apparatus 41. It is to be understood that the angle of sloping need not be considered absolute, so long as the nipples slope upwardly materially and sufficiently to discharge air in an upward direction to produce the desired results. It has been found that by sloping the nipples at an angle of approximately 45 degrees superior results are produced.

Fluid under pressure and heated as desired by means of the apparatus 41 is thus available to be discharged through the nipple openings 55 into the upper zone of the drawing chamber 21. In order that the direction of discharge of the fluid from the openings 55 can be controlled with precision, each conduit 50 is rotatable about its longitudinal axis. The flexible character of the conduit sections 52 permits such action. Valves 51 are provided in the supply conduits 49 to regulate or equalize the flow of fluid to the conduits 50.

In one important phase of the invention, gaseous fluid, such as air, which has been found to be satisfactory, is introduced into the drawing chamber 21 in such manner that the stack or draft action ordinarily incidental to the passage of the gaseous fluid upwardly from the drawing chamber through the leer is satisfied or chocked off to such extent that the stream of fluid separates, a portion of it passing upwardly from the upper zone of the chamber through the outlet 36 through which the sheet glass passes, and the other portion is directed downwardly along the sheet glass. The gaseous fluid may be said to be dammed up to provide on each side of the sheet glass a quiescent gaseous zone which may be termed a backwash, and the draft action is substantially dissipated by supplying more gaseous fluid than that ordinarily evolved into drafts that pass outwardly through the upper portion of the chamber 21. There is thus created what may be termed a mill-pond effect in the fluid backed up in the drawing chamber from the upper outlet 36.

In the upper portion of the chamber, a cushioning zone is thus provided from which the stack draft of the leer is supplied and against which the lower substantially quiescent gaseous fluid zone in the chamber 21 is banked. There is, however, turbulence created immediately above the conduits 50, but as the air or gaseous fluid is shunted toward the outlet 36, a portion of such fluid is banked or packed into a substantially quiescent state after being directed downwardly adjacent the glass sheet. During operation of the tank, tests have shown that a gas flame held upwardly in the outlet opening 36 responds definitely to draft action of considerable velocity. On the other hand, a gas flame held in the chamber 21 immediately below the opening 36 is not appreciably subjected to draft action, but it actually flattens or spreads out lazily in a depressed manner, or is actually directed downwardly a short distance. In other words, the stack or draft action created in the leer incidental to the passage of heated gaseous fluid upwardly therein is so balanced with respect to the amount of gaseous fluid injected into the chamber 21 through the conduit openings 55 that the chamber is maintained free from excessive pressure, while at the same time, draft or stack action, or any upward rush of heated gases from the surface of the molten bath 26 into the lower or upper zones on opposite sides of the sheet glass 30, is likewise prevented.

These upper and lower zones provide shielding curtains or films of air which protect the areas along opposite sides of the sheet glass 30 from whatever movement of air that occurs in the chamber and which might otherwise affect the surface pattern and the uniformity of cooling of the glass.

In connection with the existence of the substantially quiescent or balanced zone on which the downwardly shunted portion of the blown-in air balances the upward force of the hot gases in their natural impulse to rise from the bath surface, it should be noted that whatever gases which may be rising from the bath in excess of those required in the balanced zone, are deflected away from, and prevented from creating drafts or convection currents along or adjacent the plane of drawing. Such rising currents of gases are deflected to locations outside the substantially quiescent zone by the latter and are thus prevented from disturbing the uniform setting of the glass sheet as described. Since these gases which would otherwise rush up the sides of the glass sheet are either balanced or deflected outwardly, they do not produce objectionable wiping action on the glass and do not create appreciable disturbance even in the locations outside the coolers or in the areas adjacent the inner sides of the L-blocks 22.

Distinction is to be made between conditions, on the one hand, wherein certain areas in the drawing chamber are subject to material differentials in temperature, and conditions, on the other hand, wherein the atmosphere in and surrounding the drawing chamber is substantially uniform in temperature. Under favorable conditions wherein the drawing chamber does not have materially colder or hotter sides and is uniformly heated, the air supplying conduits formed and operated according to the disclosure in our application above identified (now Patent 2,352,539) are entirely satisfactory for producing the desired results.

Localized variations in temperature will result in a drifting of the chamber atmosphere wherein cooler air will move toward the location of the hotter air to displace the latter which will rise. This tendency is inherent in a chamber wherein differential temperatures exist. Air admitted into the upper portion of the chamber flows downwardly to counterbalance upward flow, but does not entirely preclude the lateral movement of air. Drifting air resulting primarily from convection may tend to rise at localized points despite the admission of air for counterbalancing purposes.

Additional control according to this invention is to prevent the localized upward or downward currents of such intensity as to mar the glass. It should be understood that the substantially quiescent condition established in the lower portion of the drawing chamber by the downward flow of air admitted from above may still include drifting atmosphere and the latter, although moving appreciably, is considered to be in a substantially quiescent state so long as it is not sufficiently strong to wipe the hot gaseous film from the glass and cause ribs to form on the surface thereof before the glass becomes set. As indicated above, the atmosphere already in the drawing chamber will drift from a cooler to a hotter location and then tend to rise. As this air rises cooler air at some location within the chamber (cooler area) will descend, become warmer, and then rise. Rising or descending currents if appreciably strong, travelling along the semiplastic sheet glass, will cause a ribbed effect, although descending cool air will not cling as closely to the sheet glass. The lateral drifting of chamber atmosphere to be controlled is located primarily between the molten glass surface and a horizontal plane containing at least the coolers 43. Under certain circumstances, this lateral drifting action may be limited to an area below the horizontal plane of the coolers 44. By causing the drifting atmosphere to move laterally beyond the vertical edges of the sheet glass, regardless of whether or not such drifting begins intermediate the sheet glass, the latter will not be subjected to the objectionable rib-forming currents.

With reference to Figs. 2 and 3, it is assumed for purposes of illustration, that if the air were expelled directly vertically from the metal conduit 50, localized temperature differentials in the drawing chamber would cause the drifting of the atmosphere laterally in the lower area of the chamber toward a marginal portion of the sheet glass. By introducing gaseous fluid, such as air, into the drawing chamber through the metal nipples 54 which point upwardly and obliquely the laterally drifting atmosphere in the chamber passes outwardly beyond the edge of the glass sheet. Therefore, upward or downward currents of sufficient intensity to cause ribs or streaks, which would otherwise occur along the marginal portion of the glass sheet, are not permitted to form. It is to be understood that the drifting atmosphere does not of itself create streaks upon the glass. It is only the rising or falling currents which would flow from a concentrated or localized area of drifting atmosphere that must be obviated.

Drawing chambers at different locations and relationships with respect to apparatus in which glass batch is melted, vary materially as to temperature conditions, and as to the specific manner in which the drifting chamber atmosphere behaves, although the individual drawing chambers may be constructed in the same manner. If there is a tendency of the chamber atmosphere to rise at or adjacent the left-hand side of the drawn glass sheet 30 in the arrangement shown in Fig. 3, then the conduits 50 are so arranged that the air under pressure is introduced to the conduits from the right-hand side of the drawing chamber with the nipples sloping in the direction indicated. The reverse of this operation has been found to produce materially improved results, but the improvement is more spectacular when the air is admitted in the manner described in the preceding sentence. In reversing the position of the conduits, the reversal should include the nipples 54. That is, if the conduits are to be reversed from their position as shown in Fig. 3, the nipples would then slope upwardly from left to right, and the air from the apparatus 41 would be admitted under pressure from the left-hand side of the drawing chamber.

Referring to Fig. 5, each metal conduit 50a is provided with metal nipples 54a of somewhat different arrangement from that shown in Fig. 4. According to Fig. 5, the nipples 54a which have openings 55a therein are disposed in such relation as to fan out in an upright plane adjacent each side of the plane of drawing. Under certain conditions, the central portion of the glass sheet may be subject to less variation in atmospheric conditions in the chamber. In order to protect the marginal portions of the sheet glass under such conditions, only the nipples at the end portions of the conduits 50 are obliquely disposed. In applying the conduits 50a in place of the conduits 50 as viewed in Fig. 3, the nipples adjacent the right hand marginal portions of the drawn glass 30 are disposed at such angles as to lean to the right and those at the left hand side are disposed at such angles as to lean to the left.

Certain intermediate nipples are disposed substantially vertically, others are disposed between the vertical position and an angle of 45° to the horizontal, and others at angles of substantially 45° to the horizontal. Those along the end portions of the conduits are disposed in the latter position, but all of these nipples have their openings facing upwardly whether angularly or directly vertically.

In another form of conduit 50b shown in Figs. 8 and 9, the upper wall of each metal conduit is provided with a metal strip 54b welded thereon to provide a thicker upper wall section. Openings 55b arranged to slope upwardly from the inside to the outside surface of the conduit pass through the built-up thicker wall section, including the strip 54b. The passage of air from the supply apparatus 41 through the sloping openings 55b is substantially the same as that described with reference to Figs. 3 and 4.

In utilizing the conduits with sloping nipples or sloping outlets for discharging gaseous fluid upwardly in the upper area of the drawing chamber, it has been found that improved results can be secured by disposing the nipples in either direction, that is, sloping from right to left or from left to right, so long as the inlet ends of the conduits and the outlet openings are arranged in the same relation as that indicated in Figs. 2 and 3. That is, when the nipples or openings slope upwardly from right to left, the gaseous fluid is to be admitted from the right.

In previously known types of the glass drawing tank, currents of gaseous fluid created by the draft action or by convection, would rush upwardly from the base or meniscus of the drawn glass to wipe off the surfaces thereof and cool the latter rapidly. This action was far in excess in intensity to the drifting action of the atmosphere described above. The wiping action of the upwardly rushing air would create a condition wherein the surfaces or skins of the glass sheet would be cooled much faster than the interior or core thereof. Contraction would occur at the surfaces or skins of the glass from edge to edge thereof. Then later, when the glass would begin to set, warping or other distortion of the sheet would be inevitable.

In this improved arrangement, these disadvantages have been obviated and it has been found that exceptionally satisfactory results can be secured by positioning each row of openings 55 in such relation that the major portion of the gaseous fluid expelled therefrom is directed or shunted, by the aid of the bottoms of the cullet pans 38, toward the opening 36 to accentuate the damping or choking off of the draft action that tends to operate upwardly into the leer. It is not necessary to expel the fluid from the openings 55 at great velocity, or to heat this fluid excessively. The desired results have been achieved by heating the gaseous fluid fed through the conduits 50 to any temperature ranging from 100 degrees to 1000 degrees F. before forcing it through the conduits 50. It is not necessary to subject the fluid in the chamber to pressure greater than atmosphere pressure as a result of the blowing of fluid from the conduits 50. In fact, by observation it is noted that during successful operation of the apparatus, there occurs a drift of air somewhat lazily into the chamber 21 when small observation windows or doors are opened for purposes of facilitating inspection of the interior of the chamber.

It is apparent that quiescent zones could be properly established and controlled at higher or lower pressures than those normally employed so long as the proper balance and control were maintained. Excellent results have been secured by establishing inside the supply conduits a fluid pressure approximately equal to that determined by 0.5 of an inch water column, i. e., approximately 0.29 ounces per square inch.

Likewise, excellent results have been achieved by heating the gaseous fluid, such as air, to a temperature of approximately 475 degrees F. before forcing it through the conduits 50. At approximately 10 inches above the molten glass bath in zones closely adjacent or on the sheet glass, the temperature of the surfaces of the glass sheet drawn in a conventional chamber, which was not provided with equivalents of the conduits 50, ranges from approximately 1250 to 1300 degrees F. A significant phenomenon occurs in connection with the improved operation of blowing fluid through the conduits 50, in that the blowing of the relatively cooler fluid at 475 degrees F. into the chamber 21, whose interior temperature is normally much higher than that of the blown-in fluid, actually produces a materially higher temperature along the surfaces of the glass sheet. This condition of temperatures occurs as a result of the action of the blown-in fluid creating the quiescent zones wherein the hot films of air along the glass surfaces are not wiped off by strong drafts or other air currents. In other words, these films can be termed dead air areas which constitute effective insulators and tend to adhere to the hot surfaces of the glass. They are not wiped off by any forced or natural currents. Such dead air areas resist in appreciable degree the effect of the drifting or circulating of the gaseous fluid in the drawing chamber. In cooling the glass sheet by radiation or adsorption of heat through the films of air, proper control and balance can be established and maintained by the degree of cooling provided in the big coolers 40, and other conventional cooling devices.

The big coolers 40 arranged adjacent the base of the sheet glass absorb heat radiated from the skin 56 and core 57 of the sheet glass, and the degree of cooling can be governed by the amount of cooling fluid employed, size of the coolers, etc. The skin 56 on opposite sides of the glass sheet 30 and the core 57 are diagrammatically illustrated in Fig. 7. Since each cooler 40, in effect, constitutes a vertical wall section extending upwardly from the inner extremity of the base section 25 of the L-block 22, the currents of gaseous fluid descending from the conduit 50 along the vertical section 23 and remote from the surface of the glass sheet are broken up. The coolers 40 and the chamber walls, including the walls of the glass sheet, thus cooperate with the fluid supplying conduits 50 in preventing the formation of drafts and convection currents. These elements also thus cooperate in establishing a quiescent zone or dead air area adjacent each side of the sheet glass base and upwardly along each surface of the glass to provide for the uniform cooling by radiation from both the skin and core of the glass.

Therefore, throughout the thickness of sheet glass, temperature differentials are substantially dissipated to insure uniform setting of the glass incidental or prior to the beginning of the annealing stage. This setting action occurs in the lower portion of the chamber 21 in a zone extending, with reference to the type of melting tank under consideration here, approximately six to fifteen inches upwardly from the surface of the molten glass bath on opposite sides of the sheet glass 30. This zone must be carefully controlled as to temperatures and the action of the volume of gaseous fluid therein.

In the form of tank in which the improved features of the invention have been included, the bottoms of the cullet pans 38 slope upwardly in converging relation and the air or gaseous fluid is expelled below these bottoms in substantially vertical directions. The slope of the cullet pan bottoms insures the shunting of a major portion of the fluid toward the opening 36. As the fluid stream reaches the opening 36, or upon approaching this opening, it becomes abated and the fluid separates into two streams, one of which flows upwardly toward the leer opening to satisfy the draft action and the other flows slowly downwardly toward the sheet glass in the upper portion of the chamber for a short distance until it becomes banked and substantially quiescent and drifts so slowly as not to disturb the film of air, or dead air areas, on the surfaces of the drawn sheet of glass. If the bottoms of the cullet pans were horizontal, the openings 55 would then be directed at an angle to the vertical and more toward the opening 36 to cause the blowing of a major portion of the fluid toward this opening.

From the foregoing description it will be apparent that the apparatus involved in the application of the invention provide for the production of exceptionally advanced quality of sheet glass without greatly modifying known types of apparatus now in commercial use, and hence, the value of the improvements are proportionately much greater than the costs of additional structure involved in the practice of the invention.

Although several arrangements involved in the practice of the invention have been shown and described in detail, it will be apparent to those skilled in the art that the invention is not so limited, but that various changes can be made therein without departing from the spirit of the invention or from the scope of the appended claims.

We claim:

1. In an apparatus for drawing sheet glass from a molten glass bath and including a drawing chamber, glass drawing means defining an upwardly extending plane of drawing through said chamber, conduits disposed on opposite sides of the plane of drawing, each of said conduits having a row of openings formed in the upper portion thereof for discharging gaseous fluid into the upper portion of said drawing chamber, the axis of each of said openings sloping upwardly from the inner side of the conduit wall to the outer side thereof, the mouths of said openings being directed upwardly and obliquely to direct gaseous fluid obliquely from areas extending substantially the width of the sheet glass and said openings being spaced along a horizontal area and means for supplying gaseous fluid under pressure through the conduits and openings therein.

2. In a glass drawing apparatus, a drawing chamber having mechanism for drawing sheet glass upwardly and defining a plane of drawing along which the sheet glass passes upwardly from a molten glass bath, said chamber having an upper opening through which the drawn glass is adapted to pass, one side of said chamber adjacent an edge of the plane of drawing being hotter than the opposite side of the chamber adjacent the opposite edge of the plane of drawing, conduits disposed substantially horizontally upon opposite sides of the plane of drawing, a row of upwardly extending hollow nipples communicating with the interior of each conduit and integral with the latter, nipples on one conduit sloping at angles to the longitudinal axis thereof and obliquely toward the hotter side of the chamber to discharge fluid in the upper portion of said chamber, nipples on the other conduit sloping upwardly at angles to the longitudinal axis thereof and obliquely toward the hotter side of the chamber to discharge fluid in the upper portion of said chamber and means for supplying gaseous fluid under pressure to the conduits.

3. In a glass drawing apparatus, a drawing chamber having mechanism for drawing sheet glass upwardly and defining a plane of drawing along which the sheet glass passes upwardly from a molten glass bath, said chamber having an upper opening through which the glass is adapted to pass, conduits disposed substantially horizontally upon opposite sides of the plane of drawing, a row of nipples opening upwardly from the interior of each conduit and integrally connected to the latter, nipples of each conduit being disposed in substantially the same plane, nipples adjacent one end of each conduit leaning in directions away from the nipples adjacent the other end of the conduit, certain nipples intermediate the ends of the conduits being substantially vertically disposed, and means for supplying gaseous fluid under pressure to the conduits.

4. In a glass drawing apparatus, the drawing chamber having mechanism for drawing sheet glass upwardly and defining a plane along which the sheet glass is drawn from a molten glass bath, said chamber having an upper opening through which the drawn glass is adapted to pass, conduits disposed substantially horizontally upon opposite sides of the plane of drawing, means for supplying gaseous fluid under pressure into corresponding end portions of said conduits, a row of upwardly extending hollow nipples communicating with the interior of each conduit, the nipples of each conduit being disposed at an angle to the vertical and leaning along the upper conduit side away from the direction of admission of gaseous fluid into said end portions of said conduits.

5. In a glass drawing apparatus, a drawing chamber having mechanism for drawing sheet glass upwardly and defining a plane of drawing along which the sheet glass passes upwardly from a molten glass bath, said chamber having an upper opening through which the glass is adapted to pass, conduits disposed substantially horizontally upon opposite sides of the plane of drawing, a row of nipples opening upwardly from the interior of each conduit and integrally connected to the latter, the nipples adjacent each side of the plane of drawing extending upwardly at angles of approximately 45° to the longitudinal axis of the conduit on which they are formed, and means for supplying gaseous fluid under pressure to the conduits.

6. In the production of sheet glass in a drawing chamber in which draft and convection currents inherently tend to form and move upwardly along the surfaces of drawn sheet glass at the setting area thereof and in which the atmosphere in the lower portion of the drawing chamber tends to drift toward a relatively cooler chamber area, the method which comprises drawing sheet glass upwardly from a molten glass bath through the chamber, introducing gaseous medium into the chamber upwardly at an angle to the vertical toward the region of at least one edge of the sheet glass and in planes substantially parallel to the plane of the sheet glass substantially across the width of said glass to cause drifting atmosphere to move laterally beyond marginal portions of the drawn glass before it can become localized, and cooling the sheet glass in the chamber until said glass becomes set, said gaseous medium being applied in the oblique relation along areas extending the entire width of the sheet glass.

7. In the production of sheet glass, the method which comprises drawing a sheet of glass upwardly from a molten glass bath through a substantially closed drawing chamber, introducing a gaseous medium into the chamber adjacent the top of the latter in an obliquely upward direction in planes substantially parallel to the plane of the sheet glass substantially across the width of said glass and under a pressure sufficient only to substantially overcome and balance the tendency of the gases in the space adjacent the sheet between the meniscus and the upper chamber portion to form draft and convection currents, thereby causing laterally drifting atmosphere in the lower portion of the chamber to pass laterally beyond the marginal portions of the sheet glass, said gaseous medium being applied in the oblique relation along areas extending the entire width of the sheet glass.

HOWARD L. HALBACH.
GEORGE D. CAMPBELL.
WALTER G. KOUPAL.

REFERENCES CITED

The following references are of record in the file of this patent:

UNITED STATES PATENTS

| Number | Name | Date |
|---|---|---|
| 1,377,622 | Kemnal, et al. | May 10, 1921 |
| 1,380,403 | March | June 7, 1921 |
| 1,764,758 | Slining | June 17, 1930 |
| 2,057,357 | Amsler | Oct. 13, 1936 |
| 2,140,281 | Drake | Dec. 13, 1938 |
| 2,201,286 | Bundy | May 21, 1940 |
| 2,278,328 | Magrini | Mar. 31, 1942 |
| 2,287,136 | Rolland, et al. | June 23, 1942 |
| 2,352,539 | Halbach, et al. | June 27, 1944 |

FOREIGN PATENTS

| Number | Country | Date |
|---|---|---|
| 536,769 | Germany | Oct. 26, 1931 |